United States Patent [19]

Samowich

[11] 4,329,386

[45] May 11, 1982

[54] DECORATIVE LAMINATE

[76] Inventor: Joseph J. Samowich, 38 Greenwich Ave., Apt. 9D, New York, N.Y. 10014

[21] Appl. No.: 537,445

[22] Filed: Dec. 30, 1974

[51] Int. Cl.³ .................... B32B 5/18; B32B 5/22; B32B 5/24
[52] U.S. Cl. .................... 428/196; 428/201; 428/202; 428/203; 428/204; 428/211; 428/233; 428/246; 428/284; 428/314.2; 428/318.6
[58] Field of Search .................... 161/160, 161; 117/161 UZ; 428/201, 203, 204, 202, 211, 233, 246, 284, 315

[56] References Cited

U.S. PATENT DOCUMENTS

| Re. 28,682 | 1/1976 | Hoey | 428/315 |
|---|---|---|---|
| 3,446,685 | 5/1969 | Goldstone et al. | 156/209 |
| 3,591,401 | 7/1971 | Snyder et al. | 428/310 |
| 3,607,341 | 9/1971 | Goins et al. | 428/262 |
| 3,804,700 | 4/1974 | Hoey | 428/196 |

*Primary Examiner*—William J. Van Balen
*Attorney, Agent, or Firm*—Nolte and Nolte

[57] ABSTRACT

A decorative laminate comprising a substrate, a foam adhered thereto and a top layer of clear film with a decoration encapsulated between the foam and the film, together with a method for manufacturing said laminate.

36 Claims, No Drawings

DECORATIVE LAMINATE

This invention concerns a decorative laminate and a process for its manufacture.

The laminate includes a substrate, a foam that adheres thereto, a top layer of a clear film and a decoration which is encapsulated between the foam and the film. Preferably, the substrate is a textile fabric, the foam is a crushed thermoset self-adhering foam, the film is also a thermoset material capable of self-adhering to said foam and the decoration is printing or some other coloring on the side of the film adjacent the foam. Preferably, the film and the foam are both acrylic polymers.

The preferred embodiment of the decorative laminate is manufactured by depositing a clear cross-linkable or thermosettable acrylic film on silicone-coated release paper. The film is dried without thermosetting and the decoration is printed on the dried clear film while it is still on the release paper. A similar cross-linkable acrylic polymer is foamed, applied to a fabric and dried without thermosetting to form a foam-backed fabric. The printed side of the clear film and the foamed side of the foam-backed fabric are then brought together, the foam is crushed and the film and foam are heated enough to cross-link the polymers.

Details of the manufacture of the foam-backed fabric are set forth in U.S. Pat. No. 3,607,301 to Goins and Morris, which is hereby incorporated by reference. As detailed in that patent, foam may be applied to all manner of substrates including "textile fabrics of woven, knitted, felted or other construction, plastic films, fiberglass, paper and the like as well as other flexible sheet material". It may also be applied to numerous rigid materials. The foam that is used is typically a polymerized latex emulsion with a water soluble surfactant that functions both as a foaming aid and a foaming stabilizer. Numerous examples of suitable emulsions and surfactants are set forth in the '301 patent and will not be detailed herein except to observe that acrylic emulsions are preferred.

Details of foaming the latex, applying it, drying it, crushing it and curing it are also described in the '301 patent and need not be discussed in detail. It should be noted, however, that the steps of crushing and curing the foam are not carried out in the practice of the preferred embodiment of the invention until the foam has been joined to the decorated film. One of the reasons for crushing the foam is to make the laminate flexible and to give it a fabric-like hand. Typically, the foam is crushed to less than 25% of its uncrushed thickness. However, it is not crushed completely, so it is also possible to emboss the laminate to give it any of a desired number of textures.

The film that is used can be any material that will adhere to the foam but for ease of manufacture the film should be self-bonding or self-adhering to the foam. Numerous examples of suitable film and foam combinations will be readily apparent to those skilled in the art. Preferably, the film and the foam should be made from acrylic emulsions. For mass production purposes, suitable rolls of acrylic film on silicone-coated release paper can be purchased commerically from suppliers such as Rohm & Haas. It is also possible to make acrylic films by hand using transfer emulsions such as DECAL-it which is available in art stores.

Decoration is preferably provided by designs executed in printing inks. To prevent bleeding of these designs the amount of plasticizer in the film and foam should be held to a minimum. At present, it appears that 2 or 3% of plasticizer in the foam does not cause noticeable bleeding in the design.

For mass production, designs are printed on a roll of acrylic film using conventional printing presses. This roll and a similar size roll of foam-backed fabric are then fed together with the printed side of the acrylic film contacting the foam side of the foam-backed fabric. The film and foam-backed fabric are bonded together by passing them through a pair of heated rollers that are spaced close enough together to crush the foam the desired amount. If it is desired to emboss the decorative laminate, the roller adjacent the film may be shaped to effect such embossing. The temperature of the heated roller is such as to cure the film and foam. Typical curing temperatures range from approximately 200 to 400 degrees Fahrenheit. Further curing of the resulting film/foam/fabric decorative laminate may be accomplished by additional heating at appropriate temperatures.

The silicone-release paper may be removed from the film before the film, foam and fabric are passed through the heated rollers. Preferably, however, the paper is not removed from the film until the foam is crushed by the rollers. This keeps the surface of the roller adjacent the film from accumulating any of the acrylic film. In addition, by using an embossable release paper instead of plain paper it is possible to emboss the decorative laminate, without using a specially shaped roller, at the same time as the foam is crushed by the rollers. As still another alternative, embossing may be performed as a separate step after the foam is crushed.

Individual designs can be formed by hand by coating a transfer acrylic emulsion onto an inked design on paper. Several such coatings may be necessary to provide a strong enough film. The coatings are first dried and then the emulsion-coated design is soaked in warm water to transfer ink to the film. The design is then dried and the paper peeled off leaving only the acrylic film into which the inked design has been transferred. This side of the film bearing the ink is then placed in contact with the foam side of a foam-backed fabric and heat and pressure are applied to bond the film and the foam-backed fabric into a unitary film/foam/fabric decorative laminate.

EXAMPLE

In practicing the invention by hand the acrylic film was prepared by coating a lithograph with a transfer emulsion such as DECAL-it. Several coatings were applied and let dry. The emulsion-coated lithograph was then soaked for several hours in warm water and then dried. The lithograph was then peeled off leaving only the acrylic film which bore the lithographic inks transferred from the lithograph. The ink side of the film was then placed in contact with the foam side of a foam-backed acetate spun rayon drapery fabric such as is made by Virginia Dyeing Corporation. Using hand pressure with a hot electric iron, the film/foam/fabric composite was then bonded together simultaneously crushing the foam. The crushed foam in the resulting laminate was less than approximately 10 mils thick and the film was on the order of 2 or 3 mils thick. Patterns were embossed in the film/foam/fabric laminate by pressing shaped solid objects into the laminate. It is believed that the foam-backed textile fabric used had been crushed and cured in the process of its manufacture by Virginia Dyeing Corporation. Nevertheless, it was possible to crush this foam still more by applying pressure and to effect cross-linking between the film and the foam by applying heat as is evidenced by the fact that the resulting laminate was indeed bonded together.

What is claimed is:
1. A laminate consisting of
   a. a transparent plastic surface film of a thermoset emulsion polymer adhered to
   b. a crushed, crosslinked thermoset resilient foam of a thermoset emulsion polymer adhered to
   c. a textile fabric substrate, with
   d. a decorative layer between (a) and (b) the crushed foam layer (b) being self-bonded to the substrate (c) and the surface film.
2. The article of claim 1 in which the surface film has printed thereon a decorative layer (d) between (a) and (b), the article has a fabric-like hand, and the crushed foam is less than about 90 mils in thickness.
3. A laminate consisting of
   a. a transparent plastic surface film adhered to
   b. a crushed, crosslinked thermoset resilient foam adhered to
   c. a substrate with
   d. a decorative layer between (a) and (b), the crushed foam layer (b) being self-bonded to the substrate (c) and the surface film.
4. The article of claim 3 wherein the substrate is a rigid material.
5. The article of claim 3 wherein the substrate is a flexible material, the decorative layer is printed on the surface film, and the article has a fabric-like hand.
6. The article of claim 5 wherein the surface film and the resilient foam are both thermoset emulsion polymers.
7. The article of claim 5 wherein both the surface film and the resilient foam are thermoset acrylic emulsion polymers.
8. A laminate comprising
   a. a transparent plastic film,
   b. a crushed resilient foam, and
   c. a substrate with
   d. a decorative layer between (a) and (b), the crushed foam layer (b) being self-bonded to the substrate (c) and the transparent film (a).
9. The article of claim 8 wherein the substrate is a rigid material.
10. The article of claim 8 wherein the substrate is a flexible material, the decorative layer is printed on the transparent film and the article has a fabric-like hand.
11. The article of claim 10 wherein the transparent film and the resilient foam are both thermoset emulsion polymers.
12. The article of claim 10 wherein both the transparent film and the resilient foam are thermoset acrylic emulsion polymers.
13. An article comprising
   a transparent plastic film,
   a crushed resilient foam, and
   a substrate, the crushed resilient foam being bonded to the substrate and being self-bonded to the transparent plastic film.
14. The article of claim 13 wherein the substrate is a rigid material.
15. The article of claim 13 wherein the transparent film and the resilient foam are both thermoset emulsion polymers.
16. The article of claim 13 wherein both the transparent film and the resilient foam are thermoset acrylic emulsion polymers.
17. The article of claim 13 further comprising a decorative layer applied to said transparent plastic film.
18. The article of claim 17 wherein the substrate is a flexible material, the decorative layer is printed on the transparent film and the article has a fabric-like hand.
19. A laminate consisting of
   a. a pre-formed transparent plastic surface film of a thermoset emulsion polymer adhered to
   b. a crushed, crosslinked thermoset resilient foam of a thermoset emulsion polymer adhered to
   c. a textile fabric substrate, with
   d. a decorative layer between (a) and (b), the crushed foam layer (b) being self-bonded to the substrate (c) and the surface film.
20. The article of claim 19 in which the surface film has printed thereon a decorative layer (d) between (a) and (b), the article has a fabric-like hand, and the crushed foam is less than about 90 mils in thickness.
21. A laminate consisting of
   a. a pre-formed transparent plastic surface film adhered to
   b. a crushed, crosslinked thermoset resilient foam adhered to
   c. a substrate with
   d. a decorative layer between (a) and (b), the crushed foam layer (b) being self-bonded to the substrate (c) and the surface film.
22. The article of claim 21 wherein the substrate is a rigid material.
23. The article of claim 21 wherein the substrate is a flexible material, the decorative layer is printed on the surface film, and the article has a fabric-like hand.
24. The article of claim 23 wherein the surface film and the resilient foam are both thermoset emulsion polymers.
25. The article of claim 23 wherein both the surface film and the resilient foam are thermoset acrylic emulsion polymers.
26. A laminate comprising
   a. a pre-formed transparent plastic film,
   b. a crushed resilient foam, and
   c. a substrate with
   d. a decorative layer between (a) and (b), the crushed foam layer (b) being self-bonded to the substrate (c) and the transparent film (a).
27. The article of claim 26 wherein the substrate is a rigid material.
28. The article of claim 26 wherein the substrate is a flexible material, the decorative layer is printed on the transparent film and the article has a fabric-like hand.
29. The article of claim 28 wherein the transparent film and the resilient foam are both thermoset emulsion polymers.
30. The article of claim 28 wherein both the transparent film and the resilient foam are thermoset acrylic emulsion polymers.
31. An article comprising
   a pre-formed transparent plastic film,
   a crushed resilient foam, and
   a substrate, the crushed resilient foam being bonded to the substrate and being self-bonded to the transparent plastic film.
32. The article of claim 31 wherein the substrate is a rigid material.

33. The article of claim 31 wherein the transparent film and the resilient foam are both thermoset emulsion polymers.

34. The article of claim 31 wherein both the transparent film and the resilient foam are thermoset acrylic emulsion polymers.

35. The article of claim 31 further comprising a decorative layer applied to said transparent plastic film.

36. The article of claim 35 wherein the substrate is a flexible material, the decorative layer is printed on the transparent film and the article has a fabric-like hand.

* * * * *